United States Patent [19]
Gilligan et al.

[11] Patent Number: 4,662,667
[45] Date of Patent: May 5, 1987

[54] OPTICAL RECORD HANDLING APPARATUS

[76] Inventors: Robert J. Gilligan, Meckler Rd., Naponoch, N.Y. 12458; Jesse Green, c/o Concord Hotel, Kiamesha Lake, N.Y. 12751

[21] Appl. No.: 886,134

[22] Filed: Jul. 16, 1986

[51] Int. Cl.⁴ .......................... B25J 15/08; B65G 7/12
[52] U.S. Cl. .................................... 294/16; 294/27.1; 294/104
[58] Field of Search ................ 294/6, 15, 16, 26, 27.1, 294/28, 31.1, 33, 34, 62, 104, 137, 158, 165

[56] References Cited

U.S. PATENT DOCUMENTS

| | | | |
|---|---|---|---|
| 3,219,375 | 11/1965 | Van Pelt | 294/16 |
| 3,261,634 | 7/1966 | Hewson | 294/16 |
| 3,282,589 | 11/1966 | Morrison | 294/28 |
| 4,417,757 | 11/1983 | Morrison | 294/28 X |
| 4,595,221 | 6/1986 | de Geus et al. | 294/16 |
| 4,595,222 | 6/1986 | Schumacher | 294/16 |

FOREIGN PATENT DOCUMENTS 1317289  1/1963  France ................... 294/16

OTHER PUBLICATIONS

IBM Technical Disclosure Bulletin, vol. 17, No. 6, Nov. 1974, "Pickup Tool" by K. Schoenfeld.

*Primary Examiner*—Johnny D. Cherry
*Attorney, Agent, or Firm*—Pollock, Vande Sande & Priddy

[57] ABSTRACT

Optical record disc handling apparatus for avoiding contamination of optical disc surfaces. A U-shaped handle supports on a first extending leg a centering post approximately midway between an inside edge of the supporting leg and the optical disc center. A remaining extending leg supports a pivotal gripping member which may be operated by the index finger. The pivotal gripping member is pivotal between a disc grasping position and disc releasing position. The centering post is advantageously spring loaded in the axial direction to permit a slight downward force to be applied to a centering hub in the disc storage package. The device is capable of being manufactured by standard injection molding techniques which are simple and economical.

8 Claims, 5 Drawing Figures

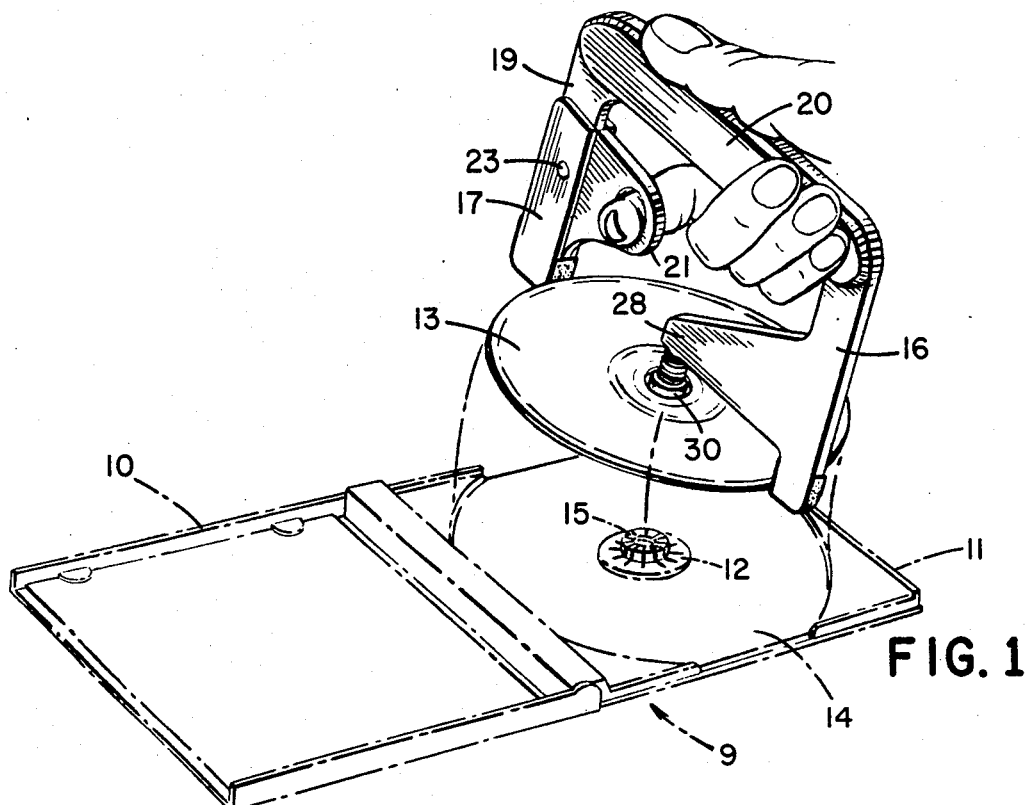
FIG. 1
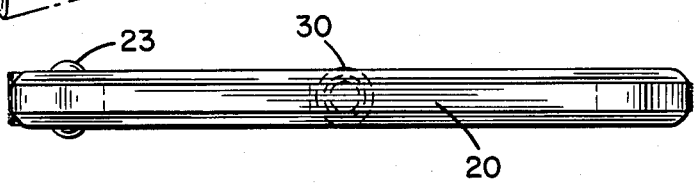
FIG. 5
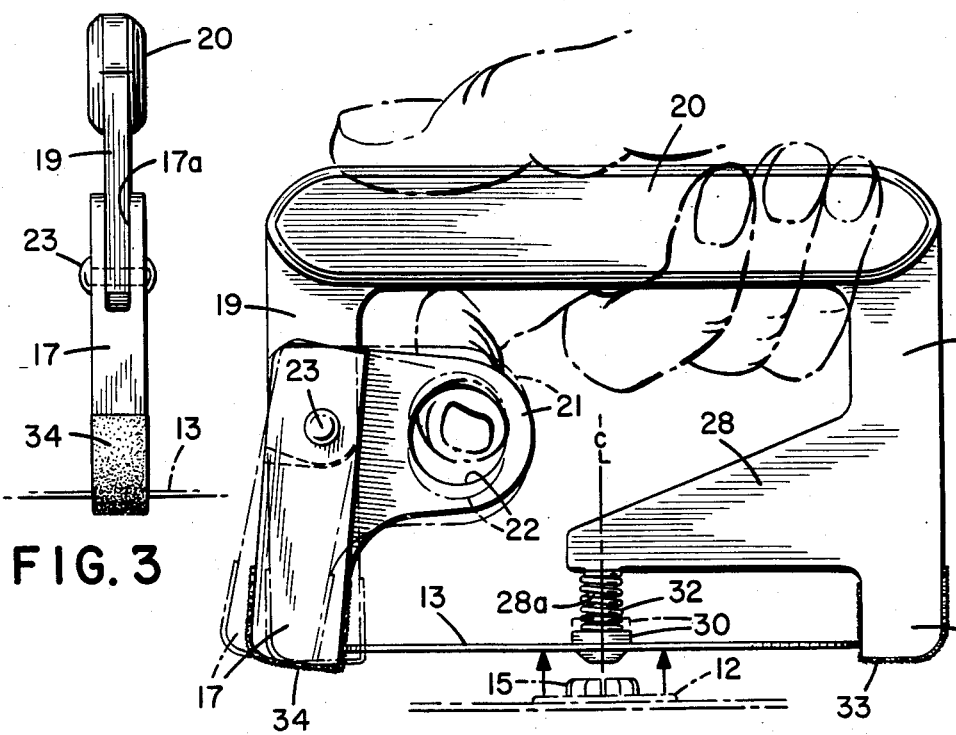
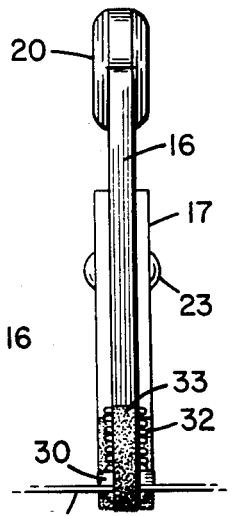
FIG. 3
FIG. 2
FIG. 4

OPTICAL RECORD HANDLING APPARATUS

The present invention relates to the handling of optically read record carriers. Specifically, a handoperated device for inserting and removing laser discs from a storage package is described.

Optically read record carriers, known generally as "compact discs", have come to represent the latest technology for recording and playing back music with distortion and noise levels far below those of conventional records. Radio stations in particular have been collecting large inventories of compact discs for reproducing the state-of-the-art sound capable with this technology.

As has become well known, the technique for recording and playing back music on optical discs employs a contact-free laser beam which reads optical indicia recorded on the disc surface. During read-back or playback of the optical disc, the reflections from the disc surface optical indicia provide for a modulated light beam carrying the recorded information.

It has become recognized among audiophiles and commercial broadcasting establishments that optical discs are subject to distortion by virtue of light being blocked or scattered during read-back due to surface contamination of the disc surface. Commercial disc cleaning apparatus are now sold which will maintain the optical disc in near perfect condition when regularly used.

A major source of surface contamination can be traced to improper handling of the optical discs. Frequent removal and insertion of the optical discs from the storage package will, over time, contaminate the surface with fingerprints and other surface contaminants which result from an unskillful handling of the disc.

The present invention is directed to minimizing the contamination of optical disc surfaces due to mishandling or even conscientious handling which results in fingerprints and other surface contaminants. With the present invention, the optical disc surface contamination is maintained at a minimum, reducing the total contamination the optical disc surface receives over a lifetime.

SUMMARY OF THE INVENTION

It is an object of the present invention to avoid contamination of an optically read surface.

It is a more specific object of the invention to provide an apparatus which will permit removal and replacement of an optical disc from its storage package without contaminating the surface.

These and other objects are accomplished by a handling apparatus which may be utilized with a minimum of skill and which will avoid frequent and inconvenient cleaning procedures.

In a preferred embodiment, a U-shaped handle is provided having first and second extending legs, which preferably have a distance between them exceeding the diameter of an optical disc. One of the associated legs of the handle supports a centering post having a tapered point for permitting centering of the apparatus with respect to an optical disc which is to be grasped.

A displaceable grasping member is connected with one of the extending legs. An extension of the grasping member permits displacement of the grasping member with respect to the opposite leg of the handle. Thus, with a single hand holding the hand-gripping section of the handle, the index finger can be used to pivot the grasping member from an open position wherein the handle may be positioned with respect to a disc to be grasped, and a closed position for securely grasping the disc between the opposite leg and grasping member. In practice, it is found that only a slight tension need be applied to the grasping member extension to retain the disc between the grasping member and extending leg.

DESCRIPTION OF THE FIGURES

FIG. 1 illustrates the general operation of the record handling apparatus in accordance with the preferred embodiment.

FIG. 2 illustrates the handling apparatus of FIG. 1 in greater detail, showing both the open and the closed positions for grasping and releasing a record carrier.

FIG. 3 is a first side view of the record handling apparatus of FIGS. 1 and 2.

FIG. 4 is a right side view of the record handling apparatus of FIGS. 1 and 2.

FIG. 5 is a top view of the record handling apparatus of FIG. 1.

DESCRIPTION OF A PREFERRED EMBODIMENT

Referring to FIG. 1, there is shown the record handling apparatus in accordance with a preferred embodiment of the invention, as it is used in removing an optical disc 13 from a standard storage package 9. The storage package 9 typically includes a hinged top 10 and bottom 11. The bottom 11 includes an aperture 14 having a diameter slightly larger than the diameter of the optical disc 13. A flexible hub 15 and support shoulder 12 support the disc 13 a fractional distance from the bottom of aperture 14. Thus, during storage, disc 13 resides in aperture 14, centered by flexible hub 15 and supported by the shoulder 12. The package top 10 can then be closed to seal the disc 13 from contamination.

The disc handling apparatus of FIG. 1 includes a U-shaped handle having a gripping section 20. The gripping section 20 includes at both ends first and second extending legs 16 and 19 spaced apart a distance greater than said circular record disc.

A centering post 30 is supported to the leg 16 at a distance from the inside edge 16a of leg 16 to permit centering of the disc 13 with respect to the U-shaped handle.

Pivotally mounted to the leg 19 by means of a pivot pin 23 is a grasping member 17. Grasping member 17 may be advantageously pivoted so that an inside surface thereof is brought into contact with an edge of the disc 13. Thus, when disc 13 is in the storage position within aperture 14, the U-shaped handle may be brought into position by centering the handle with centering post 30 over the aperture contained in optical disc 13. After centering of the handling apparatus with respect to the optical disc 13, the index finger of the user is used to bring grasping member 17 into contact with the edge of the optical disc 13. By maintaining a slight tension with the index finger on grasping member 17, the disc 13 may be removed from its case 11 and placed in a disc player for playing.

Having thus described the general operation of the handling apparatus in accordance with the preferred embodiment of the invention, the construction of the handling apparatus will now be described in detail.

As will be evident from FIGS. 2, 3, 4 and 5, the apparatus may be made from two molded pieces, the first of the molded pieces representing the grasping member 17 and the remaining of the molded pieces having legs 16, 19 and gripping section 20. Also molded as an integral part of leg 16 is the lateral support arm 28 which supports the centering post 30. Thus, once having molded the two pieces either by injection molding or other techniques which will be obvious to those familiar with synthetic material manufacture, the two pieces can be connected together by a pivot pin 23. This pin is shown as a rivet member which is inserted through facing apertures of the grasping member 17 and leg 19.

The grasping member 17, as will be evident from FIG. 3, includes a longitudinal slot 17a which receives the leg 19. Leg 19 and grasping member 17 have an aligned hole for being fixed in pivotal relationship by pivot pin 23. Felt or other friction-producing material 34 is placed over the surface of the grasping member 17 which is to contact the optical disc 13 circumferential edge.

The remaining end of the grasping member 17 includes an extension 21 which is operated by the index finger. In the preferred embodiment, an aperture 22 is left in the extension 21 for receiving the index finger, permitting pivoting of the grasping member 17 from an open to a closed position.

As shown in FIG. 2, the centering post 30 may be supported on the end of a spring 32 for axial movement. Spring 32 may, at its second end, be held by a molded projection 28a on lateral support arm 28. The molded projection 28a is located at a distance from the inside edge 16a of leg 16, substantially equal to the radius of the disc. Thus, during centering of the disc handling apparatus with respect to disc 13, edge 16a will be aligned with the outer circumference of optical disc 13, and centering post 30 having a tapered end will be positioned in the hole contained in optical disc 30.

Having thus centered the handling apparatus, the individual user will apply a slight downward force to gripping section 20 such as to depress the flexible hub 15 downwardly. Having thus put a slight downward pressure on flexible hub 15, the user will move the grasping member 17 with the index finger so that edge 34 is in contact with the edge of the optical disc. Felt or other friction-producing material 33 is also included on the edge of leg 16, to facilitate grasping of the opposite circumferential edges of the disc.

Having thus released the disc 13 from the flexible hub 15, and grasped it at opposite circumferential edges, the operator may, with a slight tension on the finger-operable extension 21, remove the disc and place it in a disc player for use. During removal of the disc 13 from the disc player, the same procedure is applicable.

With the foregoing disc handling apparatus, serious audiophiles and commercial radio stations will find frequent cleaning to be unnecessary. The foregoing device can be manufactured and assembled economically. It has been found in practice that no particular bearing means are required to maintain the movable grasping member connected to the arm 19, nor is any tension or biasing required between the leg 19 and the grasping member 17. It may be possible to make grasping member 17 movable with respect to arm 19 without a pivot pin. All that is required are means to provide relative movement between the grasping member 17 and arm 16. Thus, with a minimum of skill using only a slight tension applied by the index finger, optical discs may be handled, avoiding any surface contamination which would result by handling the discs with the fingers.

Thus, there is described with respect to one embodiment a preferred handling apparatus for use with optical discs. Those skilled in the art will recognize yet other embodiments described by the claims which follow.

What is claimed is:

1. An apparatus for handling a circular record disc without contaminating a surface thereof comprising:
   a U-shaped handle having a first hand gripping section for grasping, and first and second extending legs spaced apart at a distance greater than a diameter of said circular record disc;
   a centering post supported approximately midway between said extending legs, said centering post having an outside diameter tapered for inserting in a centrally located hole in said record disc; and
   a displaceable grasping member displaceably connected to said first leg having an end which is displaceable from a first open position to a second closed position with respect to said second leg for grasping in cooperation with said second leg the circumference of said record disc when said centering post is received in said record disc hole.

2. The apparatus of claim 1 wherein said grasping member includes at an opposite end thereof a finger operable extension.

3. The apparatus of claim 1 wherein said second leg and grasping member include a felt surface for enhancing grasping of said record disc.

4. The apparatus of claim 1 wherein said centering post is supported for axial displacement.

5. An apparatus for handling a circular record disc without contaminating a surface thereof comprising:
   a U-shaped handle having a longitudinal gripping section and first and second perpendicularly extending legs, said second leg including a lateral support arm extending towards said first leg;
   a centering post supported parallel to said second leg by said lateral support arm, said centering post having a tapered end for insertion into a centering hole of said record disc, the distance between said center post and a facing edge of said second leg being substantially the radius of said record disc; and,
   a grasping member pivotally connected to said first leg for pivotal movement with respect to said second leg, whereby said record disc may be grasped between said second leg edge and said grapsing member when said centering post is received in said record disc.

6. The apparatus of claim 5 wherein said centering post is axially displaceable.

7. The apparatus of claim 5 wherein said centering post is supported to said lateral support arm by means of a spring.

8. The apparatus of claim 5 wherein said grasping member includes a finger operable extension extending towards said longitudinal gripping section for receiving an index finger to pivot said grasping member.

* * * * *